United States Patent
Otowa

(10) Patent No.: US 6,663,391 B1
(45) Date of Patent: Dec. 16, 2003

(54) SPOTLIGHTED POSITION DETECTION SYSTEM AND SIMULATOR

(75) Inventor: Yasuhiro Otowa, Tokyo (JP)

(73) Assignee: Namco Ltd., Tokyo (JP)

( * ) Notice: Subject to any disclaimer, the term of this patent is extended or adjusted under 35 U.S.C. 154(b) by 286 days.

(21) Appl. No.: 09/642,636

(22) Filed: Aug. 22, 2000

(30) Foreign Application Priority Data

Aug. 26, 1999 (JP) .............................. 11-239879

(51) Int. Cl.[7] .............................. F41A 33/00; F41G 3/26; G09B 19/00
(52) U.S. Cl. .............................. 434/16; 434/21; 463/36
(58) Field of Search .............................. 434/16, 19, 20, 434/21; 273/312; 463/46, 36

(56) References Cited

U.S. PATENT DOCUMENTS

| | | | | |
|---|---|---|---|---|
| 3,996,674 A | * | 12/1976 | Pardes et al. | |
| 4,084,194 A | * | 4/1978 | Hector | 358/254 |
| 4,229,009 A | | 10/1980 | Ohta | |
| 4,657,511 A | * | 4/1987 | Allard et al. | 434/20 |
| 4,680,012 A | * | 7/1987 | Morley et al. | 434/22 |
| 5,190,286 A | * | 3/1993 | Watanabe et al. | 273/85 |
| 5,194,006 A | * | 3/1993 | Zaenglein, Jr. | 434/19 |
| 5,194,008 A | * | 3/1993 | Mohan et al. | 434/22 |
| 5,215,465 A | * | 6/1993 | Marshall et al. | 434/22 |
| 5,224,860 A | * | 7/1993 | Waldman et al. | 434/21 |
| 5,276,524 A | * | 1/1994 | Inoue et al. | 358/237 |
| 5,366,229 A | * | 11/1994 | Suzuki | 273/310 |
| 5,421,589 A | * | 6/1995 | Monroe | 273/437 |
| 6,110,039 A | * | 8/2000 | Oh | 463/2 |
| 6,174,169 B1 | * | 1/2001 | Gerber | 434/11 |

FOREIGN PATENT DOCUMENTS

| | | |
|---|---|---|
| EP | 0690409 A1 | 3/1996 |
| WO | WO94/25816 A1 | 11/1994 |

* cited by examiner

Primary Examiner—Derris H. Banks
Assistant Examiner—Ali Abdelwahed
(74) Attorney, Agent, or Firm—Oliff & Berridge, PLC

(57) ABSTRACT

A spotlighted position detection system and simulator which can eliminate the influence of unnecessary light such as an external light and exactly detect a spotlighted position. There is provided a game machine which comprises: a half mirror as a display screen which transmits a spotlight or an infrared light from a ray gun and reflects a light for images from a CRT; an infrared transmission filter as a light filter which is disposed on a backside of the half mirror and transmits the spotlight but does not transmit an external light; a spotlight screen on which the spotlight transmitted through the half mirror and the infrared transmission filter is projected to form an image, the spotlight screen being disposed at a position near the backside and within the game machine; and a CCD camera which takes a spotlighted area on the spotlight screen corresponding to an image area.

12 Claims, 4 Drawing Sheets

SPOTLIGHTED POSITION DETECTION SYSTEM AND SIMULATOR

BACKGROUND OF THE INVENTION

1. Field of the Invention

The present invention relates to a spotlighted position detection system and a simulator.

2. Description of Related Art

For example, in a simulator for performing a gun shooting game, a spotlight emitted from a gun device is projected onto a screen and then taken by a CCD camera for detection.

However, the screen may receive a light from the light source or an external light other than the spotlight. In such a case, a spotlighted position cannot be exactly detected since lights other than the spotlight are also detected at the same time.

To overcome such a problem, there is a method in which a spotlighted position is detected by flashing the game screen (i.e., by momentarily whitening the entire game screen).

However, such a method raises another problem in that if emission of the spotlight from the gun device is continuously repeated, undesirable flicker may frequently occur such that the game screen is hard to look at.

SUMMARY OF THE INVENTION

It is therefore an objective of the present invention to provide a spotlighted position detection system and simulator which can eliminate the influence of other unnecessary lights such as an external light to exactly detect a spotlighted position.

(1) According to a first aspect of the present invention, there is provided a spotlighted position detection system comprising:

a display screen which displays an image, and transmits or reflects a spotlight projected from light projection means;

a spotlight screen on which the transmitted or reflected spotlight is projected at a position corresponding to an image area on the display screen;

image taking means for taking the spotlight screen; and detection means for detecting a spotlighted position on the display screen based on an image taken by the image taking means.

(2) According to a second aspect of the present invention, there is provided a spotlighted position detection system comprising:

a display screen which displays an image, and transmits or reflects a spotlight projected from light projection device;

a spotlight screen on which the transmitted or reflected spotlight is projected at a position corresponding to an image area on the display screen;

image taking device for taking the spotlight screen; and detection circuit for detecting a spotlighted position on the display screen based on an image taken by the image taking device.

(3) According to a third aspect of the present invention, there is provided a shooting simulator which projects a spotlight from shooting means toward a target which is a part of a displayed image, the simulator comprising:

a display screen which displays an image, and transmits or reflects the spotlight;

a spotlight screen on which the transmitted or reflected spotlight is projected at a position corresponding to an image area on the display screen;

image taking means for taking the spotlight screen; and detection means for detecting a spotlighted position on the display screen based on an image taken by the image taking means.

(4) According to a fourth aspect of the present invention, there is provided a shooting simulator which projects a spotlight from shooting means toward a target which is a part of a displayed image, the simulator comprising:

a display screen which displays an image, and transmits or reflects the spotlight;

a spotlight screen on which the transmitted or reflected spotlight is projected at a position corresponding to an image area on the display screen;

image taking device for taking the spotlight screen; and detection circuit for detecting a spotlighted position on the display screen based on an image taken by the image taking device.

According to the present invention, by separating a screen for a spotlight from a screen for images, the spotlight detection can be exactly performed without the influence of unnecessary lights.

Since such a flashing as described is not required, the spotlighted position can be detected continuously. This also eliminates a timing synchronization process between the image display and the flashing. Thus, the system can be simplified.

The system of the present invention can be installed on any of various locations for general purposes, since it is not necessary to be enclosed in dark.

(5) A light filter may be provided between the display screen and the spotlight screen to transmit only a light having a band which is within a band of the spotlight.

Since the light filter can eliminate a light having a band out of a predetermined band, a spotlighted position can be exactly detected.

Such a light filter can be implemented by a band-pass filter or an infrared transmission filter, for example.

(6) The display screen may be formed as a translucent mirror; and the spotlight screen may be disposed on one of the reflection side and transmission side of the spotlight, and an image display means may be disposed on the other of the reflection side and transmission side of the spotlight, as viewed from the light projection means.

By using a translucent mirror (or a half mirror), the function of the display screen can be inexpensively implemented.

In addition to the translucent mirror, the display screen can be implemented by a blind-shape mirror or a diffraction grating, for example.

(7) The spotlight may be an infrared light; and the light filter may include an infrared transmission filter which transmits only an infrared light.

Because a wavelength of an infrared light is different from those of unnecessary light such as an external light, such unnecessary lights can be effectively eliminated. This makes it possible to exactly detect the spotlighted position. Since an infrared light is invisible, it will not interfere with image display. In addition, such spotlight can be safely projected with no fear of harming someone.

(8) The simulator may further comprise means for determining whether or not the spotlight from the shooting means has hit the target based on a detection result by the detection means.

Since the spotlighted position can be exactly detected, it is also exactly determined whether or not the target has been hit. In a gun shooting game using a gun device, for example, if the position of the spotlight from the gun device can be exactly detected without flashing the screen, a game player can enjoy the game without any unpleasant feeling during continuous firing.

(9) The spotlight may be an invisible light.

If an invisible light is projected onto the image display area, displayed images will not be disturbed. Therefore, in a shooting game, for example, the image display can be effectively performed when the spotlight has hit the target.

DETAILED DESCRIPTION OF THE PREFERRED EMBODIMENTS

Preferred embodiments of the present invention will now be described with reference to the drawings, in connection with an example where this invention is applied to a simulator for a shooting game.

(First Embodiment)

Figure 1:
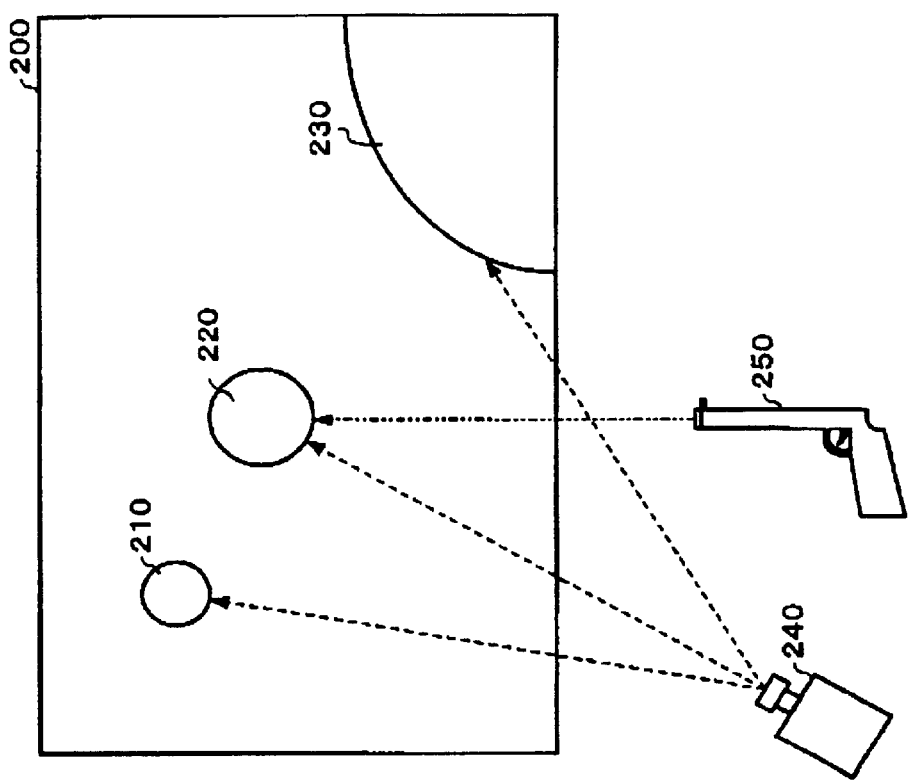
FIG. 1 is a schematic view illustrating a screen and a CCD camera for taking lights projected onto the screen.

FIG. 1 shows a screen 200 and a CCD camera 240 which takes a light projected onto the screen 200.

In a conventional shooting game, a spotlight 220 emitted from a gun device or shooting means 250 is taken by the CCD camera 240 to determine the spotlighted position. Raged on this, it is determined whether or not the spotlight has hit a target displayed on the screen 200.

In this case, since other lights like an external light 210 or a fluorescent lamp light 230 are also projected onto the screen 200 in addition to the spotlight 220, the CCD camera 240 takes these unnecessary lights such as the external light 210 and fluorescent lamp light 230, and the unnecessary lights are wrongly recognized as the spotlight 220. As a result of this, the position to which the spotlight 220 is projected cannot be detected.

In this embodiment, a display screen and a spotlight screen are provided in place of the screen 200 to overcome such a problem.

More particularly, the display screen separates a light for images from a spotlight and makes the spotlight 220 transmit while displaying images. The spotlight 220 which has passed through the display screen is projected onto the spotlight screen. By taking the spotlight screen, the above-described problem can be resolved.

This embodiment of the present invention will be further described below, concerning an example where this invention is applied to a game machine for a shooting game simulator having a display screen and a spotlight screen.

Figure 2:
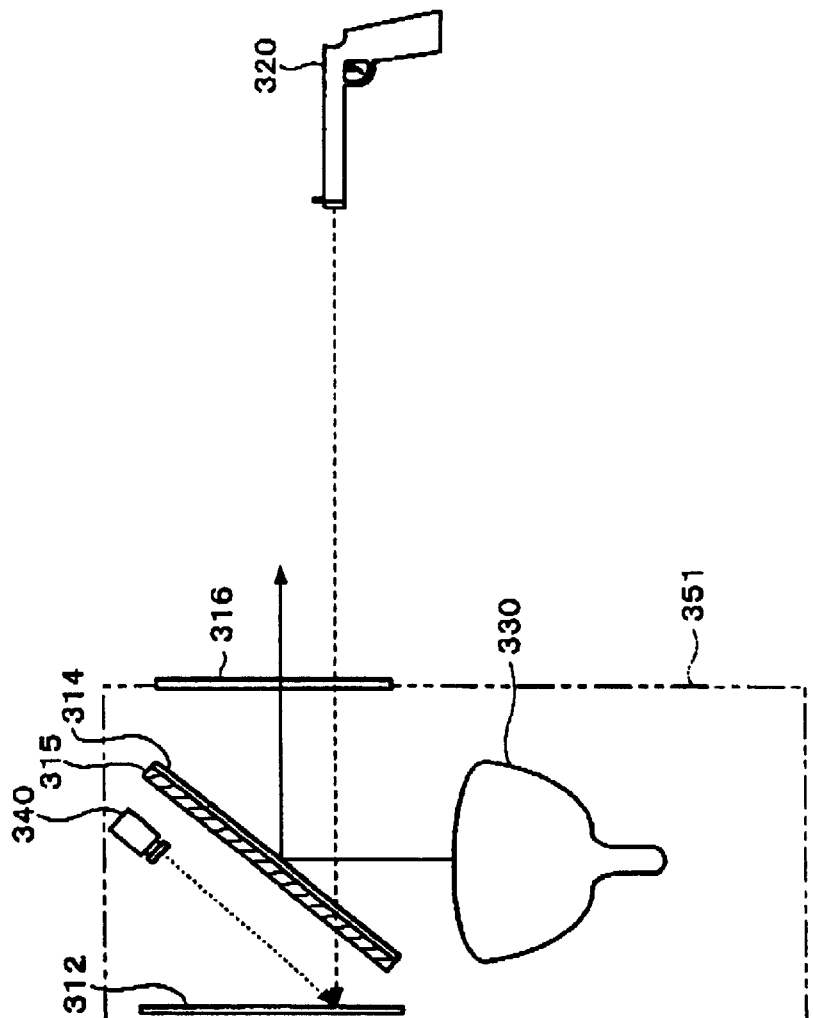
FIG. 2 is a schematic cross-section of a game machine constructed according to one embodiment of the present invention.

FIG. 2 is a schematic cross-section of a game machine 351 constructed according to one embodiment of the present invention.

The game machine 351 comprises a CRT 330 which projects a light for images, and a display screen or half mirror 314 which reflects a light for game images projected from the CRT 330.

The light reflected by the half mirror 314 is displayed on a display surface 316 as game images.

A player operates a ray gun 320 to project a spotlight toward a target displayed as a part of the game images.

The spotlight from the ray gun 320 transmits the display surface 316 and half mirror 314 and forms an image on a spotlight screen 312. In this way, a spotlighted area is formed on the spotlight screen 312 as shown by the spotlight 220 in FIG. 1.

The game machine 351 further comprises the spotlight screen 312 and a CCD camera 340 which takes the spotlighted area on the spotlight screen 312 corresponding to an image area on the display surface 316.

As described above, the spotlight screen 312 is located on the optical axis of the spotlight from the ray gun 320, and the CRT 330 which outputs the light for images is located on an axis which is substantially perpendicular to the optical axis of the spotlight. The half mirror 314 transmits the light in the direction of the optical axis of the spotlight and reflects the light in the direction which is substantially perpendicular to the optical axis.

Consequently, the spotlight can be properly distinguished from the light for images. Since the CCD camera 340 takes the spotlight screen 312 on which only the spotlight is projected, the spotlighted position can be exactly detected.

In this embodiment, the spotlight is an infrared light. In addition, the game machine 351 further comprises an infrared transmission filter 315 disposed on the backside of the half mirror 314 to transmit the infrared light but not to transmit external lights.

When the spotlight is infrared light, other lights such as an external light can be effectively be eliminated, because the infrared light has its wavelength different from those of other lights such as an external light. Therefore, the spotlighted position can be exactly detected. Furthermore, the invisible infrared light will not disturb the image display, and can be safely projected with no fear of harming someone.

Since the above-described flashing screen is not required, the detection can be continuously repeated, and also any operation such as taming synchronization between image displaying and flashing is not required, resulting in simplification of the system.

Since it is not required that the system is enclosed in dark, it can be installed in any of various places for general purposes.

Since the CCD camera 340 takes the spotlight screen 312 onto which only the spotlight is projected, unnecessary lights such as an external light will not be taken, so that conventional wrong recognition of other lights and erroneous detection can be avoided.

Therefore, accurate detection of the spotlighted position and proper judgment of hit against the target can be done, so that a game machine enabling enjoyable play of a shooting game can be implemented.

Particularly in a gun shooting game using a gun device, a player can enjoy the game when the gun device is continuously fired, since all spotlighted positions can be exactly detected without flashing.

Functional blocks for implementing such a game machine will now be described.

Figure 3:
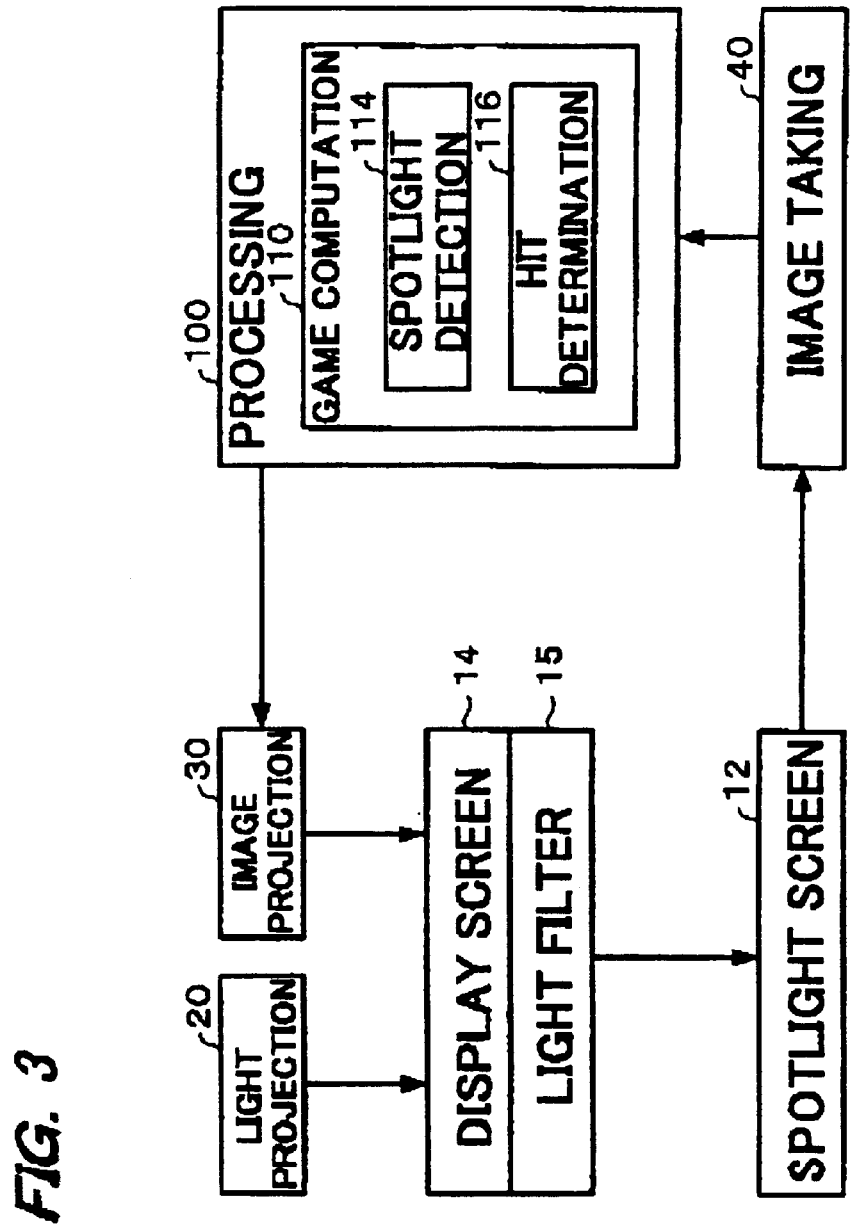
FIG. 3 is a functional block diagram of a game machine according to one embodiment of the present invention.

A functional block diagram of the game machine 351 according to one embodiment of the present invention is shown in FIG. 3.

The game machine 351 comprises a display screen 14 and a spotlight screen 12. A light for images is projected onto the display screen 14 and a spotlight from a light projection section 20 as a shooting means is transmitted through the display screen 14. The transmitted spotlight is then projected onto the spotlight screen 12.

The game machine 351 further comprises a light filter 15 which is disposed between the display screen 14 and the spotlight screen 12 to transmit only the transmitted spotlight.

The game machine 351 still further comprises an image taking section 40 and a spotlight detection section 114 The image taking section 40 takes the spotlight screen 12 at a spotlighted position corresponding to an image area on the display screen 14. The spotlight detection section 114 detects the spotlighted position within the image area on the display screen 14 based on the image taken by the image taking section 40.

The game machine 351 further comprises a processing section 100 and an image projection section 30. The processing section 100 performs general game processing based on the result of detection of the spotlighted position and a game program and game data stored in a predetermined storage region. The image projection section 30 projects game images generated by the game processing onto the display screen 14.

More particularly, the image projection section 30 can be implemented by a cathode ray tube (CRT), a projector or the like, and the image taking section 40 can be implemented by a CCD camera or the like.

In this embodiment, the processing section 100 comprises a game computation section 110 which performs game computation. The game computation section 110 includes a spotlight detection section 114 and hit determination section 116 which determines whether or not a spotlight has hit a predetermined target on the display screen 14.

The processing section 100 can be implemented by CPU, for example. The game computation section 110 performs various types of processing based on an image signal from the image taking section 40, a trigger signal from the light projection section 20, a game program stored in a predetermined storage section, or the like. For example, the game computation section 110 performs processing for receiving a coin (or charge), setting the game mode, moving the game forward, generating game image, determining target and character motions, implementing special effects, displaying letters, computing game results (such as scores or points), and terminating the game.

The spotlight detection section 114 detects a position spotlighted by the light from the light projection section 20, based on the image signals from the image taking section 40. In this embodiment, the spotlighted position is detected in a form of the coordinates (X, Y) when the upper left corner of the screen 200 of FIG. 1 is the origin (0, 0), and the horizontal axis is X-axis and the vertical axis is Y-axis.

The hit determination section 116 determines whether or not the spotlight has hit the target by comparing the spotlight coordinates (X, Y) input from the spotlight detection section 114 with the target coordinates computed when the target image has been generated. In other words, it is determined that the spotlight has hit the target when the spotlight coordinates (X, Y) is within a predetermined display area of the target image.

Note that the game computation section 110 performs computation for predetermined game effects based on the hit determination result and executes them. If the spotlight has not hit the target, the game computation section 110 makes the image projection section 30 project an image which shows that the shot has impacted out of the target. If the spotlight has hit the target, the image projection section 30 is caused to project an image showing the hit target.

The game computation section 110 also performs computation of the game result based on the hit determination result of the spotlight.

Note that the functions of the spotlight detection section 114 and other sections may be implemented in a hardware manner by using circuitry or the like, or by using a program or the like.

Since the game result depends on whether or not the spotlight has hit the target, hit determination is important for the game process.

In this embodiment, the display screen 14 and the light filter 15 are provided in order to exactly detect the spotlight.

The display screen 14 can be implemented by a translucent mirror (or a half mirror), and the light filter 15 can be implemented by an infrared transmission filter or a bandpass filter. Note that the spotlight screen 12 can be implemented by an ordinary screen such as a resin screen.

In this embodiment, by these display screen 14, light filter 15 and spotlight screen 12, the spotlight can be separated from the light for images or other lights such as an external light while images are displayed, and it can be exactly determined whether or not the spotlight has hit the target.

Although the first embodiment has been described as to the display screen 14 which reflects the light for images and transmits the spotlight, other type of a display screen transmitting the light for images and reflecting the spotlight can equally well be implemented. A display screen reflecting the spotlight will now be described.

(Second Embodiment)

Figure 4:
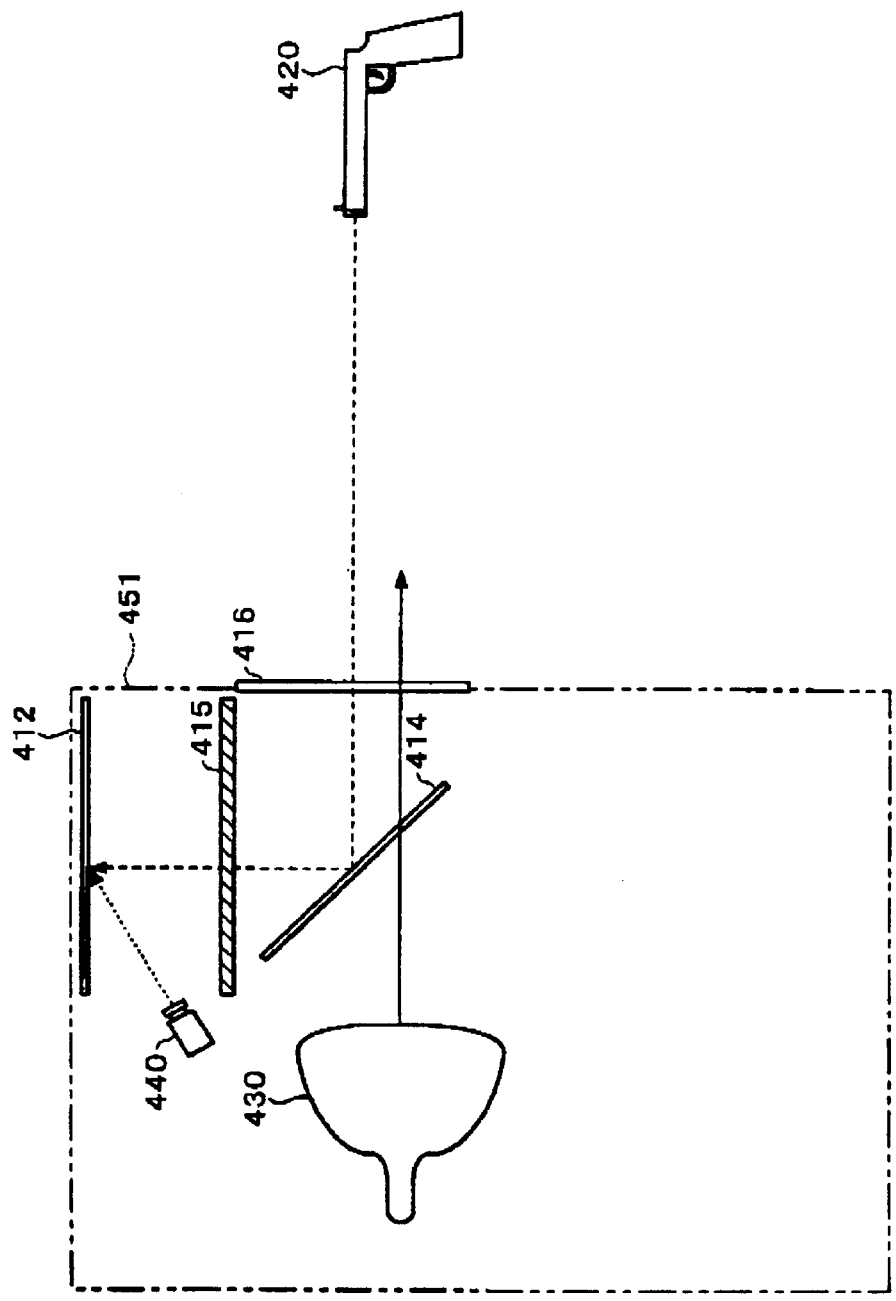
FIG. 4 is a schematic cross-section of a game machine constructed according to another embodiment of the present invention.

FIG. 4 is a schematic cross-section of a game machine 451 constructed according to another embodiment of the present invention.

The game machine 451 comprises a CRT 430 for projecting a light for images, a half mirror 414 as a display screen, and an infrared transmission filter 415. The half mirror 414 reflects a spotlight which is an infrared light from a ray gun 420 and transmits the light for images from the CRT 430. The infrared transmission filter 415 is a light filter which is disposed on an optical path of the spotlight reflected by the half mirror 414, transmits the spotlight or an infrared light but does not transmit an external light.

The game machine 451 further comprises a spotlight screen 412 disposed near the ceiling of the gate machine. The spotlight transmitted through the half mirror 414 and the infrared transmission filter 415 forms an image on this spotlight screen. The game machine 451 further comprises a CCD camera 440 which taxes a spotlighted area on the spotlight screen 412 corresponding to an image area on a display surface 416.

In this embodiment, the spotlight screen 412 is located on an axis which is substantially perpendicular to the optical axis of the spotlight from the ray gun 420, and the CRT 430 which outputs the light for images is located on the optical axis of the spotlight. The half mirror 414 reflects the light in the direction of the optical axis of the spotlight and transmits the light in the direction which is substantially perpendicular to the optical axis of the spotlight.

Consequently, as in the first embodiment, the spotlight can be properly distinguished from the light for images and the spotlighted position can be exactly detected.

Note that the light for images transmitted through the half mirror 414 is projected on the display surface 416 disposed on the front side of the game machine 451.

The light for images can be thus projected on the display surface 416 by the halt mirror 414, and unnecessary lights such as an external light can be eliminated to guide only the spotlight to the spotlight screen 412 by the infrared transmission filter 415.

Since the CCD camera 440 takes the spotlight screen 412 onto which only the spotlight is projected, unnecessary lights will not be taken, so that wrong detection of other lights such as an external light can be avoided to prevent wrong detection of the spotlighted position.

Consequently, the game machine which can exactly detect the spotlighted position and properly determine whether or not the spotlight has hit the target can be implemented.

In this way, the half mirror 414 which transmits the light for images and reflects the spotlight can equally well be used to provide the same effect as in the first embodiment.

The present invention is not limited to the aforementioned embodiments, and it can be implemented in many various ways.

For example, if a light other than the infrared light is used as a spotlight, the light filter can be implemented by a band-pass filter which transmits only a light within the band of the spotlight. Note that an invisible light which will not disturb the image display is preferably used as a light other than the infrared light.

The display screen can be implemented by a blind-shaped mirror, a diffraction grating or the like, in addition to the half mirror.

Furthermore, the present invention may be applied to a simple spotlighted position detection system. Such a spotlighted position detection system according to the present invention may be used as an optical pointing device which provides a click function by projecting a light onto a predetermined image on the screen, for example.

Moreover, the present invention can be applied to any of other suitable simulators for a rifle competition, shooting training or the like, in addition to the shooting game simulator.

What is claimed is:

1. A spotlighted position detection system, comprising:
   a display screen which displays an image, and transmits or reflects a spotlight projected from a light projection means;
   a spotlight screen on which only the transmitted or reflected spotlight is projected at a position corresponding to an image area on the display screen;
   an image taking means for taking an image of the spotlight screen; and
   a detection means for detecting a spotlighted position on the display screen based on the image taken by the image taking means.

2. The spotlighted position detection system as defined in claim 1, further comprising,
   a light filter which is provided between the display screen and the spotlight screen to transmit only the spotlight projected from the light projection means.

3. The spotlight detection system as defined in claim 1,
   wherein the display screen is formed as a translucent mirror; and
   wherein the spotlight screen is disposed on one of a reflection side and a transmission side of the spotlight, and an image display means is disposed on another of the transmission side and the reflection side of the spotlight, as viewed from the light projection means.

4. The spotlight detection system as defined in claim 2,
   wherein the spotlight is an infrared light; and
   wherein the light filter includes an infrared transmission filter which transmits only an infrared light.

5. A shooting simulator which projects a spotlight from a shooting means toward a target which is a part of a displayed image, the simulator comprising:
   a display screen which displays an image, and transmits or reflects the spotlight;
   a spotlight screen on which only the transmitted or reflected spotlight is projected at a position corresponding to an image area on the display screen;
   an image taking means for taking an image of the spotlight screen; and
   a detection means for detecting a spotlighted position on the display screen based on the image taken by the image taking means.

6. The simulator as defined in claim 5, further comprising,
   a light filter which is provided between the display screen and the spotlight screen to transmit only the spotlight projected from the shooting means.

7. The simulator as defined in claim 5,
   wherein the display screen is formed as a translucent mirror; and
   wherein the spotlight screen is disposed on one of a reflection side and a transmission side of the spotlight, and an image display means is disposed on another of the transmission side and the reflection side of the spotlight, as viewed from the shooting means.

8. The simulator as defined in claim 6,
   wherein the spotlight is an infrared light; and
   wherein the light filter includes an infrared transmission filter which transmits only an infrared light.

9. The shooting simulator as defined in claim 5, further comprising,
   a means for determining whether or not the spotlight from the shooting means has hit the target based on a detection result by the detection means.

10. The simulator as defined in claim 5, wherein the spotlight is a light invisible to an unaided human eye.

11. A spotlighted position detection system, comprising:
    a display screen which displays an image, and transmits or reflects a spotlight projected from a light projection device;
    a spotlight screen on which only the transmitted or reflected spotlight is projected at a position corresponding to an image area on the display screen;
    an image taking device for taking an image of the spotlight screen; and
    a detection circuit for detecting a spotlighted position on the display screen based on the image taken by the image taking device.

12. A shooting simulator which projects a spotlight from a shooting means toward a target which is a part of a displayed image, the simulator comprising:
    a display screen which displays an image, and transmits or reflects the spotlight;
    a spotlight screen on which only the transmitted or reflected spotlight is projected at a position corresponding to an image area on the display screen;
    an image taking device for taking an image of the spotlight screen; and
    a detection circuit for detecting a spotlighted position on the display screen based on the image taken by the image taking device.

* * * * *